(No Model.)

H. KETTERING.
HARVESTER CHAIN RAKE.

No. 300,087. Patented June 10, 1884.

Witnesses:
A. C. Eader
Jno. E. Morris

Inventor:
Henry Kettering
By Chas. B. Mann
Attorney.

UNITED STATES PATENT OFFICE.

HENRY KETTERING, OF MASSILLON, OHIO.

HARVESTER CHAIN RAKE.

SPECIFICATION forming part of Letters Patent No. 300,087, dated June 10, 1884.

Application filed October 25, 1883. (No model.)

*To all whom it may concern:*

Be it known that I, HENRY KETTERING, a citizen of the United States, residing at Massillon, in the county of Stark and State of Ohio, have invented certain new and useful Improvements in Harvester Chain Rakes, of which the following is a specification.

My invention relates to an improved conveyer-chain or endless carrier, such as are used to transfer grain in the straw across the platform of some harvesters, and for other uses where straw-carriers are employed. These chains are usually moved by the links engaging with sprockets on a drive-wheel.

The object of my invention is to provide a chain having teeth or barbs which project up in the usual fashion, and to construct the chain in such manner and so combine it with a slotted tube or equivalent guide that the chain may be capable of a limited turning or twisting movement, whereby the projecting teeth may stand straight up or at any desired inclination.

Figure 1:
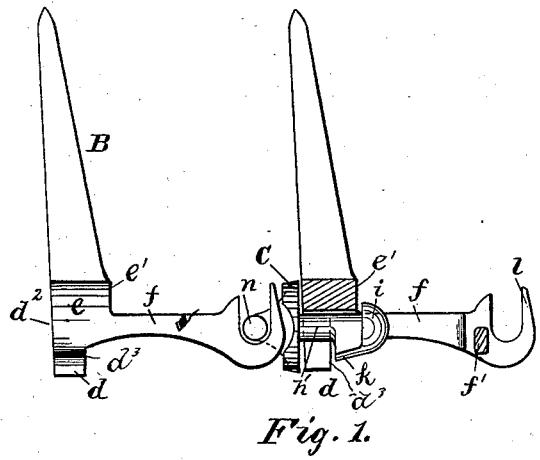
Figures 2, 3, 4:
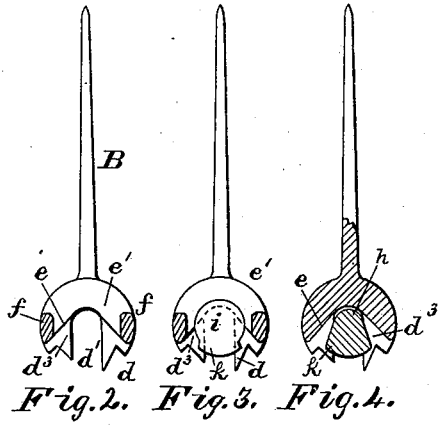
Figure 5:
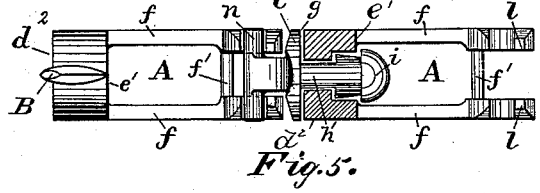
Figure 6:
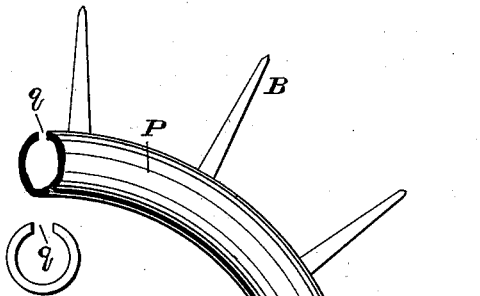
Figures 7, 8:
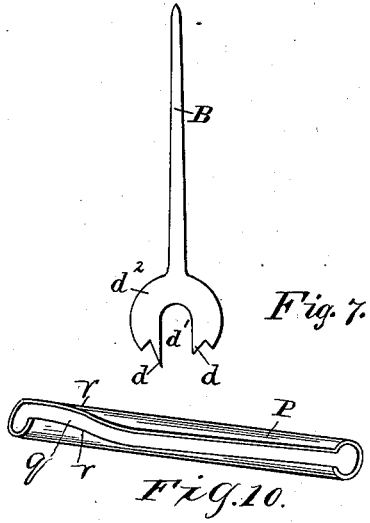
Figure 10:
Figure 9:
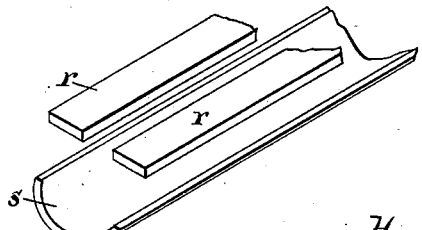

In the accompanying drawings, which illustrate the invention, Figure 1 is a side view of two links of the chain coupled together. Figs. 2, 3, and 4 are views of the link, showing the inner side of that end to which the tooth is attached. Fig. 5 is a top view of two links. Fig. 6 is a view of a portion of a slotted tube curved, and containing the chain. Fig. 7 is an outer end view of a link and its tooth. Figs. 8 and 9 are views of a modification in the guide for the chain, showing an equivalent device for a slotted tube. Fig. 10 is a view showing the slot in the tube taking a partial twisting or spiral direction.

The letter A designates the link in which the sprockets engage; B, the tooth, integral with the link, and C the coupling which connects each two links. The link is made of cast metal malleableized, and its ends, when cast, are open, as shown in Figs. 1 and 7, to connect with the coupling, and after connection said ends are closed. At one end of the link the tooth B is attached. This end, when first cast, has two points or bifurcations, $d\ d$, with an open slot, $d'$, between them. The end of the link on the outer side of the points constitutes a flat face, $d^2$. On the inner side of these points is a face, $d^3$, and adjoining this is a concave, $e$, extending from one side bar $f$ to the other, and at right angles to the concave and between the side bars is an inner flat face, $e'$. The end of the coupling which connects with the end of the link just described has a flat face, $g$, which abuts against the outer flat face, $d^2$. From the center of the face $g$ a shank, $h$, projects, having at the end a half-globular head, $i$, the inner side of which engages with or is against the inner flat face, $e'$, of the link. The end of the shank next the flat face $g$ is round, as designated by $h'$, and this round part occupies the slot $d'$ and may be turned therein. The shank end next to the half-globular head has a projection, $k$, which extends around about one-fifth of the circumference. This projection occupies the concave $e$, and its inner side is broader than the slot $d'$, so as to lap across it, and engages with or is against the face $d^3$ of the points. The projection $k$, being narrower than the concave, as shown in Fig. 4, has room to partly turn therein; but said projection serves as a stop to limit the turn of the link on the round end $h'$ of the shank. At the other end of the link the two side bars $f$ are connected by a cross-bar, $f'$, and each side bar extends beyond the cross-bar, and has, when first cast, an open hook, $l$. The two open hooks receive the side projecting lugs, $n$, on one end of the coupling-link. The open hooks are then closed by bending the points over toward the lugs $n$, as shown in Fig. 6. When the links are coupled together, the points $d$ are bent toward and one over the other, thereby closing them under the round part $h'$ of the shank. The links and the coupling have in cross-section a round shape, whereby the chain is adapted to turn readily on a suitable support, or to travel in a tube.

By the foregoing-described construction the chain may, by the coupling $l$ and $n$, travel over or around sprocket-wheels, and by the other coupling—viz., the points $d$—being closed about the round part $h'$ of the shank, the chain is capable of being turned or twisted while the projection $k$ acts as a stop to limit the turning. The chain travels through a slotted tube, P, the teeth B projecting through the slot $q$, and the two edges of the slot serving as a guide to hold the teeth straight up, or incline them to any desired angle. The round shape of the links and couplings readily permits the chain as it travels to partly turn or twist in the tube. The slot in the tubes which guides the teeth B of the chain may therefore have a partial twisting or spiral form, and thereby give the desired inclination to said teeth.

A modification which serves as the equivalent of a slotted tube is shown in Figs. 8, 9, and 10. A grooved plate, $s$, supports the chain. Two parallel strips or bars, $r$, form a slot, $q$. The teeth B project between the bars the edges whereof serve as a guide.

This chain is designed to be used in various kinds of harvesting machinery; and in some machines at certain points where the teeth pass it is desirable to give them an inclination differing from that which they assume while traveling around the sprocket-wheels. To this end the chain at such points passes through the slotted tube or equivalent guide. The guide there gives the desired inclination to the teeth, and the round part $h'$ of the shank enables the links and teeth to partly turn or twist, and thereby accommodate themselves to the said guide. For the same reason the tube in some situations may sometimes require to be curved. The stop $k$ is employed to prevent the links from turning and throwing the teeth entirely out of position when the chain is moving along where the tube or guide does not extend.

Having described my invention, I claim and desire to secure by Letters Patent of the United States—

1. A chain having a link provided with a tooth, B, and a coupling for the links having a round shank whereby the links may turn, as set forth.

2. A chain having a link provided with a tooth, B, and a coupling for the links having a round shank, and a stop device to limit the turn of the link on the shank, as set forth.

3. A chain having its links provided with a tooth, B, and a coupling for the links having a round shank, in combination with a slotted tube or equivalent guide in which the chain travels, as set forth.

In testimony whereof I affix my signature in presence of two witnesses.

HENRY KETTERING.

Witnesses:
WALTER S. KIRKLAND,
GEO. W. RAFF.